United States Patent [19]

Kusano

[11] Patent Number: 5,654,835
[45] Date of Patent: Aug. 5, 1997

[54] MAGNETIC DISK CONTROLLER CAPABLE OF AVOIDING ERRONEOUS WRITE OPERATIONS TO ZBR-TYPE MAGNETIC DISKS

[75] Inventor: Takao Kusano, Kanagawa, Japan

[73] Assignee: NEC Corporation, Tokyo, Japan

[21] Appl. No.: 547,409

[22] Filed: Oct. 24, 1995

Related U.S. Application Data

[63] Continuation of Ser. No. 139,789, Oct. 22, 1993, abandoned

[30] Foreign Application Priority Data

Oct. 27, 1992 [JP] Japan ............................. 4-288044

[51] Int. Cl.$^6$ ........................................... G11B 5/09
[52] U.S. Cl. ................... 360/51; 360/55; 395/439
[58] Field of Search ....................... 369/47, 48, 44.28, 369/32, 59; 360/66, 38.1, 48, 72.1, 51, 55, 61, 69, 77.08, 49, 104, 53; 324/212; 395/494, 439

[56] References Cited

U.S. PATENT DOCUMENTS

| | | | |
|---|---|---|---|
| 3,864,735 | 2/1975 | Davis et al. | 360/51 |
| 3,864,755 | 2/1975 | Davis et al. | 360/51 |
| 4,583,208 | 4/1986 | Verboom | 360/72.1 X |
| 4,663,752 | 5/1987 | Kakuse et al. | 360/38.1 X |
| 4,748,611 | 5/1988 | Tsoyoshi et al. | 360/48 X |
| 4,823,212 | 4/1989 | Knowles et al. | 360/77.08 |
| 4,979,055 | 12/1990 | Squires et al. | 360/69 |
| 5,083,303 | 1/1992 | Yanagida et al. | 369/48 |
| 5,241,521 | 8/1993 | Shigemori | 369/32 |
| 5,257,143 | 10/1993 | Zangenehpour | 360/48 |
| 5,278,712 | 1/1994 | Sugaya | 360/104 |
| 5,321,560 | 6/1994 | Cowen | 360/48 |
| 5,327,300 | 7/1994 | Satomura | 360/61 X |
| 5,353,175 | 10/1994 | Chiba | 360/51 |

FOREIGN PATENT DOCUMENTS

| | | |
|---|---|---|
| 0 491 264 | 12/1990 | European Pat. Off. . |
| 0 595 249 | 10/1992 | European Pat. Off. . |
| 595249 | 4/1994 | European Pat. Off. . |
| 38 24 085 | 1/1989 | Germany . |
| 89285064 | 11/1989 | Japan . |

OTHER PUBLICATIONS

Translation of Satomura Document, US Patent & Trademark Office, Ralph McElroy Translation Company, Mar. 1996.

*Primary Examiner*—Aristotelis M. Psitos
*Assistant Examiner*—Patrick Wamsley
*Attorney, Agent, or Firm*—Young & Thompson

[57] ABSTRACT

In a sector mark waiting state, when a sector mark detecting signal is input to a magnetic disk controller, the magnetic disk controller initiates a write operation of sector data on a magnetic disk. In a non-sector mark waiting state, when a sector mark detecting signal is input to the magnetic disk controller, the magnetic disk controller stops the write operation of sector data upon the magnetic disk being performed.

4 Claims, 12 Drawing Sheets

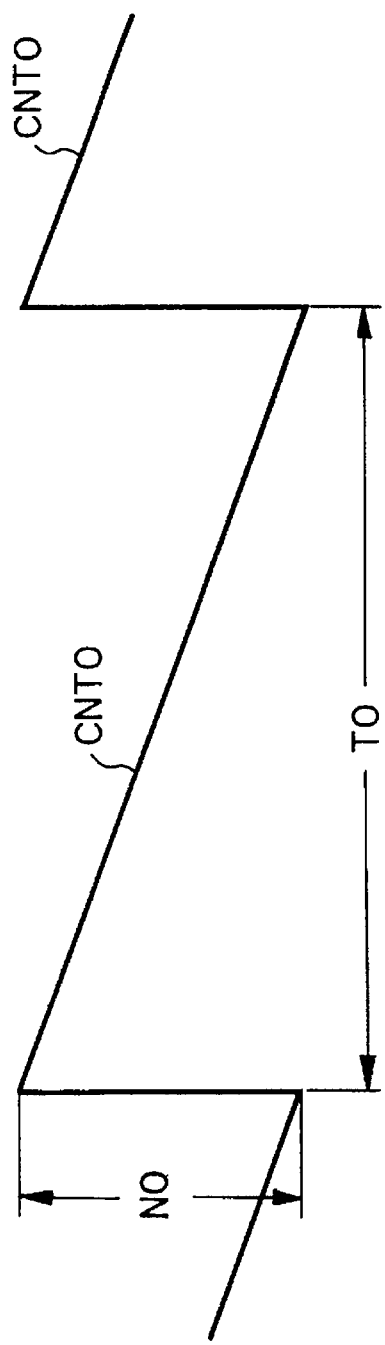
Fig. 6A PRIOR ART
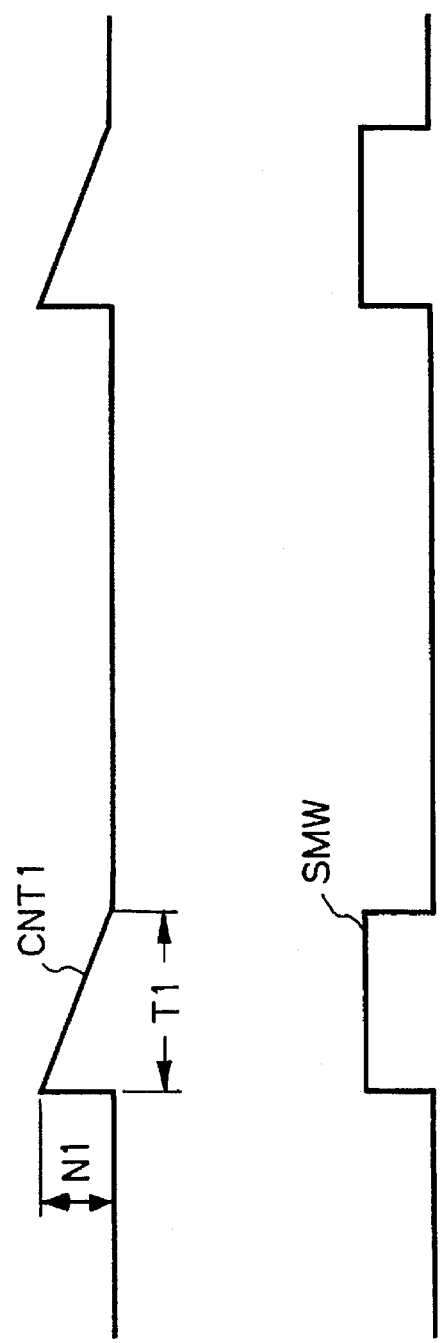
Fig. 6B PRIOR ART
Fig. 6C PRIOR ART

MAGNETIC DISK CONTROLLER CAPABLE OF AVOIDING ERRONEOUS WRITE OPERATIONS TO ZBR-TYPE MAGNETIC DISKS

This application is a continuation of application Ser. No. 08/139,789, filed Oct. 22, 1993, now abandoned.

BACKGROUND OF THE INVENTION

1. Field of the Invention

The present invention relates to a magnetic disk controller for a zone bit recording (ZBR)-type magnetic disk.

2. Description of the Related Art

Generally, a magnetic disk unit includes one or more magnetic disks mounted on one spindle, and one read/write head is provided on each of the two surfaces of each magnetic disk. Also, the surface of the magnetic disk is divided into a plurality of tracks, i.e., concentric circles depicted by a locus of the magnetic head on the magnetic disk along the spindle. In this case, a cylinder is defined by a plurality of tracks simultaneously determined by a plurality of magnetic heads. Further, a track is divided into a plurality of sectors, a sector being a minimum unit to be accessed. One logical address, which is called an identification address (ID), is allocated to each of the sectors. In this case, an ID is defined by a head number, a cylinder number, a sector number, and the like. Thus, a read/write operation on the magnetic disks can be carried out by indicating the head number, the cylinder number, the sector number, and the like. Also, in order to increase the storage capacity of the magnetic disks, a ZBR system has been suggested. According to the ZBR system, every surface on the magnetic disks is divided into a plurality of concentrically-shaped zones each having a different number of sectors. That is, the number of sectors is larger in an outer zone than in an inner zone, to thereby make the recording density uniform over the entire magnetic disk.

On the other hand, according to a prior art magnetic disk controller for performing a write operation of sector data in each sector, in a sector mark waiting state where a sector mark is expected to be detected, and when a sector mark is detected, a write operation of sector data in a desired sector of a magnetic disk is initiated.

In the above-mentioned prior art magnetic disk controller, however, if the location of a magnetic head deviates while performing a write operation of sector data upon the desired sector, an erroneous write operation may be performed upon another sector possibly causing unexpected erasure of data therein, which will be explained later in detail.

SUMMARY OF THE INVENTION

It is, therefore, an object of the present invention to reduce the possibility of an erroneous write operation due to the deviation of the location of a magnetic head in a ZBR-type magnetic disk.

According to the present invention, in a sector mark waiting state, when a sector mark detecting signal is input to a magnetic disk controller, the magnetic disk controller initiates a write operation of sector data on a magnetic disk. On the other hand, in a non-sector mark waiting state, when a sector mark detecting signal is input to the magnetic disk controller, the magnetic disk controller stops the write operation of sector data on the magnetic disk that is currently being performed. Thus, if the location of a magnetic head deviates to an adjacent zone, to effect an erroneous write operation thereon, this erroneous write operation is stopped upon detection of the next sector mark.

BRIEF DESCRIPTION OF THE DRAWINGS

The present invention will be more clearly understood from the description as set forth below, in comparison with the prior art, with reference to the accompanying drawings, wherein:

FIG. 6A, 6B and 6C are timing diagrams showing the operation of the sequencer of FIG. 3;

DESCRIPTION OF THE PREFERRED EMBODIMENTS

Before the description of embodiments of the present invention, a ZBR-type magnetic disk and a prior art magnetic disk controller will now be explained with reference to FIGS. 1 through 7.

Figure 1:
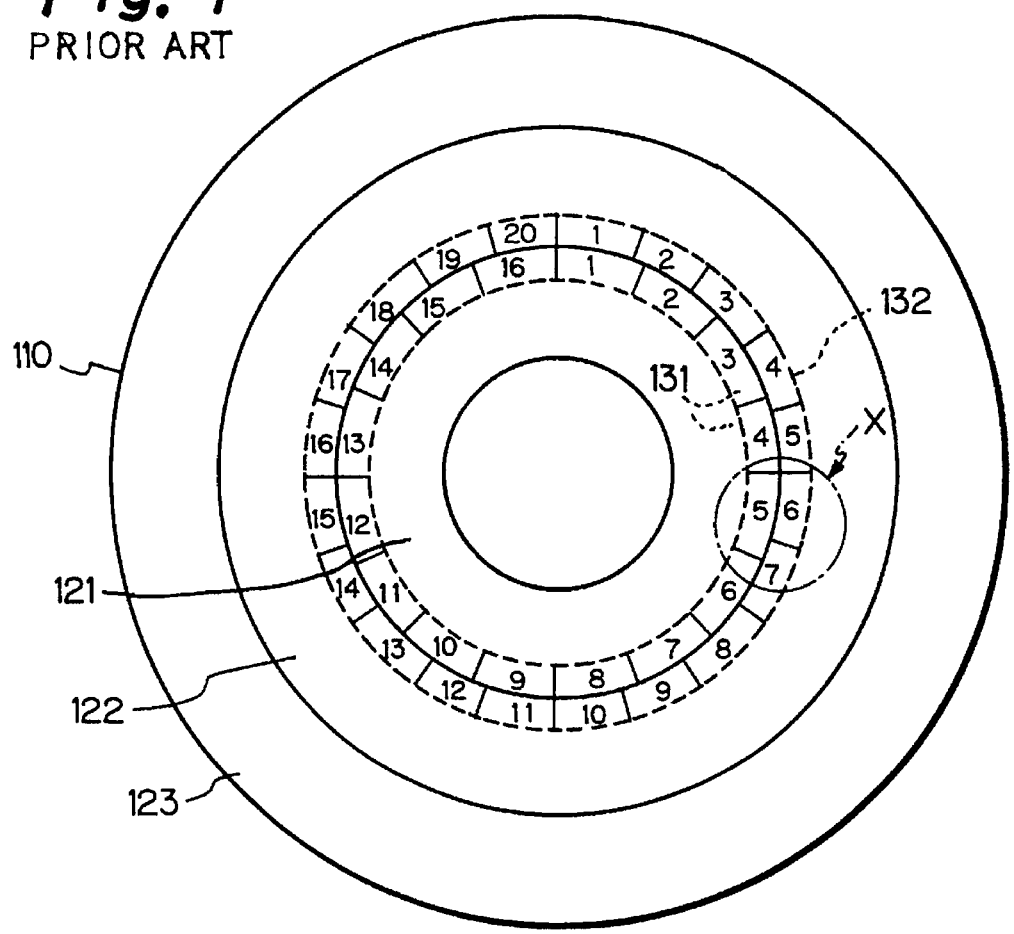
FIG. 1 is a plan view illustrating a surface of a ZBR-type magnetic disk.

In FIG. 1, which illustrates a surface of a ZBR-type magnetic disk, reference numeral 110 designates a magnetic disk whose surface is divided into a plurality of zones 121, 122, 123, . . . , each divided into a plurality of tracks. In this case, the number of sectors in one track is fixed within one of the zones. For example, the number of sectors in one track is 16 within the zone 121, and the number of sectors in one track is 20 within the zone 122. That is, the number of sectors in one track is larger in an outer zone than an inner zone, since the circumferential length of an outer zone is larger than that of an inner zone.

Figure 2:
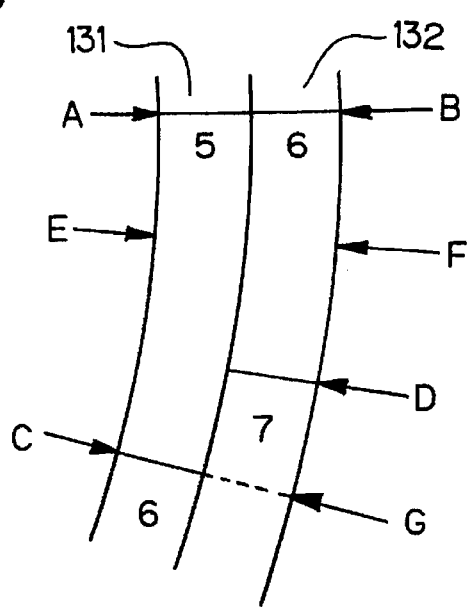
FIG. 2 is a partial enlargement of FIG. 1.

In FIG. 2, which is an enlargement of a portion X of FIG. 1, a track 131 of the zone 121 and a track 132 of the zone 122 are illustrated. In this case, a leading edge A of a fifth sector in the track 131 coincides with a leading edge B of a sixth sector in the track 132, while a trailing edge C of the fifth sector in the track 131 does not coincide with a trailing edge D of the sixth sector in the track 132.

Here, it is considered that the deviation of a location of the magnetic head (not shown) occurs due to the vibration of the magnetic disk unit (not shown), a malfunction of the servo mechanism (not shown), or a defect in the medium, and as a result, the magnetic head is moved from the track 131 to the track 132. For example, the location of the magnetic head on the magnetic disk 110 immediately before the deviation is indicated by E, and the location of the magnetic head on the magnetic disk 110 immediately after the deviation is indicated by F. Thus, in this example, the magnetic head is moved from the location E of the fifth sector in the track 131 to the location F of the sixth sector in the track 132.

Figure 3:
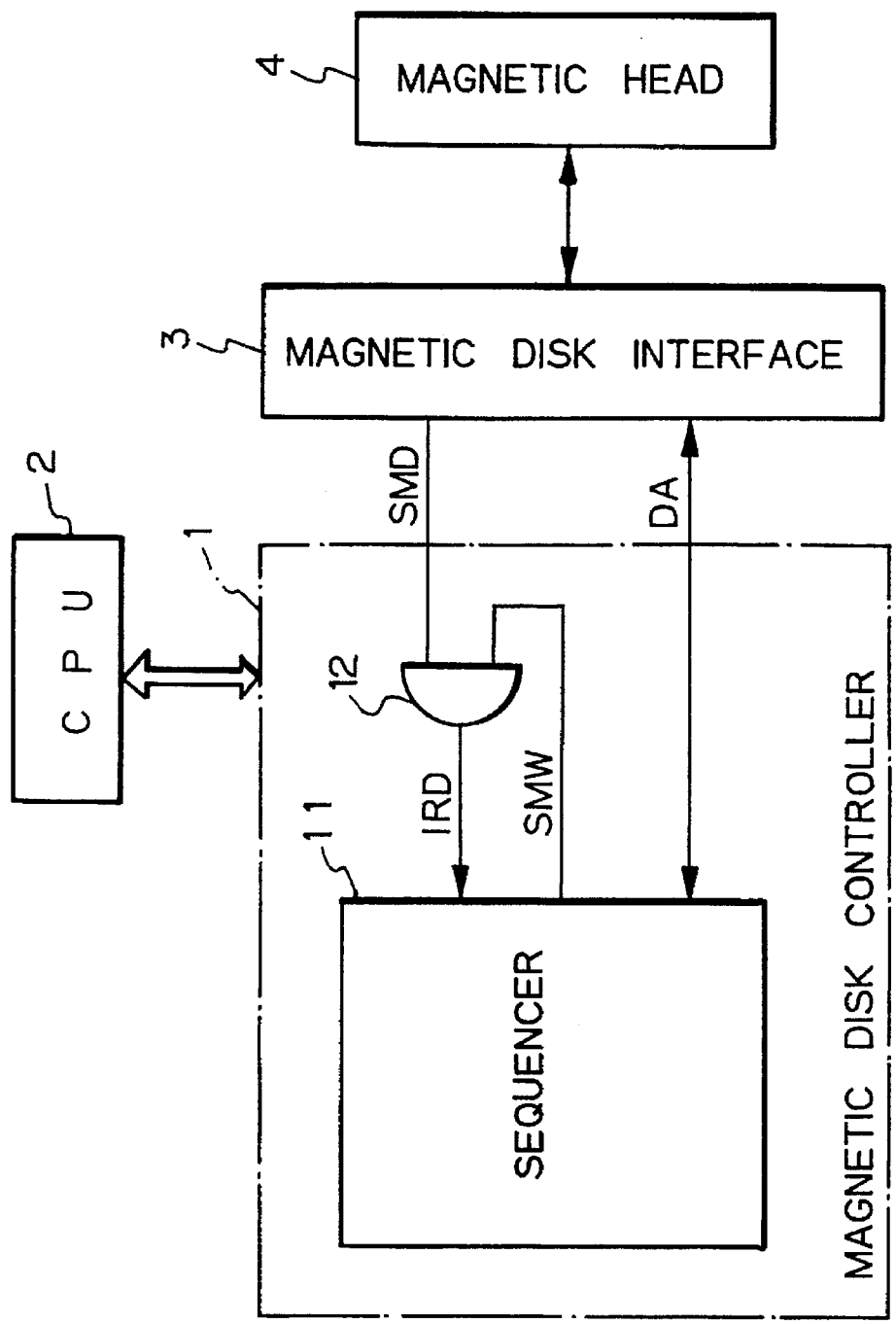
FIG. 3 is a block diagram illustrating a prior art magnetic disk controller.

In FIG. 3, which illustrates a prior art magnetic disk controller, a magnetic disk controller 1 is interposed between a central processing unit (CPU) 2 and a magnetic disk interface 3 which is connected to a read/write magnetic head 4. Note that a plurality of magnetic heads can be provided for a plurality of magnetic disks; however, in order to simplify the description, only one magnetic head is provided in this example.

The magnetic disk controller 1 includes a sequencer 11 and art AND circuit 12. The AND circuit 12 receives a sector mark detecting signal SMD signaling a border between the sectors from the magnetic disk interface 3 and a sector mark waiting signal SMW from the sequencer 11, to thereby generate an ID data read control signal IRD.

Note that the sequencer 11 includes a parallel-to serial converter for writing data via the magnetic disk interface 3 onto the magnetic disk 110 (see FIG. 1), a serial-to-parallel converter for reading data via the magnetic disk interface 3 from the magnetic disk 110, a random access memory (RAM) and the like, which are not shown. Thus, a bidirectional data line DA is connected between the sequencer 11 and the magnetic disk interface 3.

Figure 4:
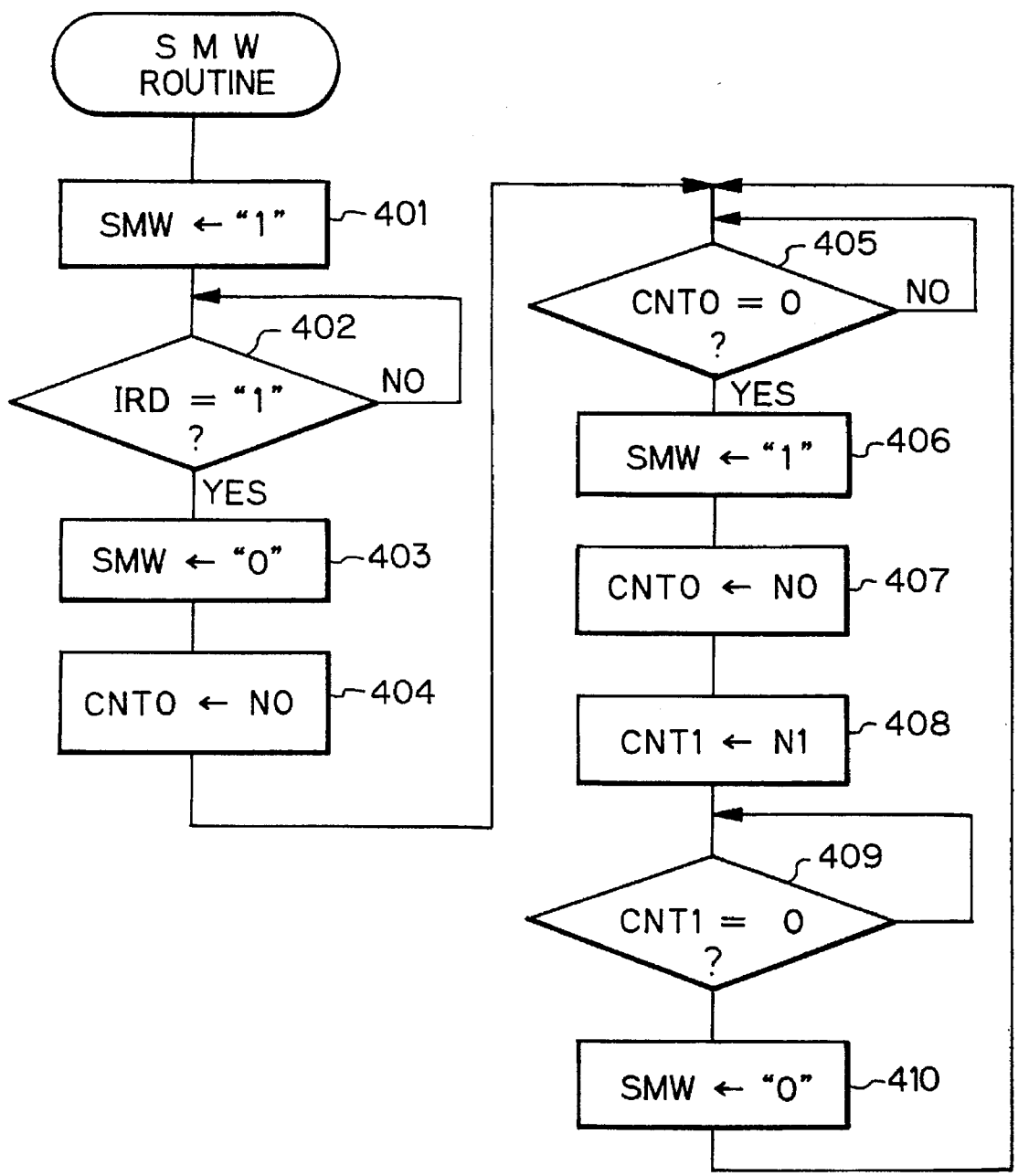
FIGS. 4, 5 and 7 are flowcharts showing the operation of the sequencer of FIG. 3.
Figure 5:
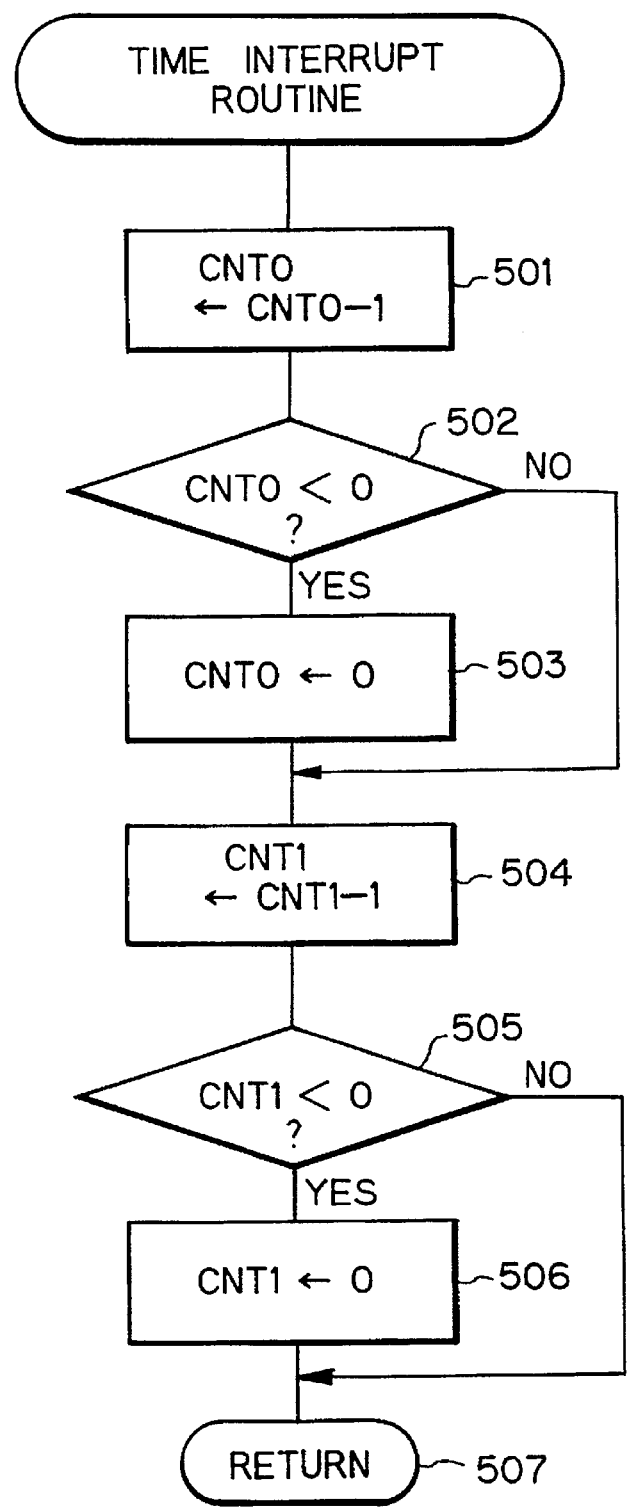

The sector mark waiting signal SMW is generated by the sequencer 11 using the logic shown in FIG. 4. A SMW routine of FIG. 4 is initiated by turning ON the magnetic disk controller 1. Steps 401 through 404 carry out an initialization. That is, at step 401, the sector mark waiting signal SMW is made active ("1"), and at step 402, the sequencer 11 waits for a first sector mark detecting signal SMD which is, in this case, a first ID data read control signal IRD due to the activation of the sector mark waiting signal SMW. Once the first ID data read control signal IRD is made active, the control proceeds to step 403 which makes the sector mark waiting signal SMW inactive. Then, at step 404, a sector interval value N0 is read out of the RAM in dependence with the currently accessed zone and is set in a counter CNT0. Thus, the counter CNT0 is initialized to be counted down by a time interrupt routine as illustrated in FIG. 5 which is carried out at predetermined time intervals. Note that the sector interval value N0 corresponds to a sector interval T0 as shown in FIG. 6A. Thus, an initialization for the first sector mark detecting signal SMD is completed.

At step 405, it is determined whether or not the value of the counter CNT0 reaches zero, i.e., whether or not a sector interval T0 has passed. Only when the sector interval T0 has passed, does the control proceed to step 406 which activates the sector mark waiting signal SMW (SMW="1") as shown in FIG. 6C.

At step 407, a sector interval value N0 is read out of the RAM in dependence with the currently accessed zone and is set in the counter CNT0. Also, at step 408, a sector mark waiting signal width value N1 is read out of the RAM in dependence with the currently accessed zone and is set in a counter CNT1. Thus, both the counters CNT0 and CNT1 are initialized to be counted down by the routine as illustrated in FIG. 5. Note that the sector mark waiting signal width value N1 corresponds to a sector mark waiting signal width T1 as shown in FIG. 6B.

At step 408, it is determined whether or not the value of the counter CNT1 reaches zero, i.e., whether or not a sector mark waiting signal width T1 has passed. Only when the sector mark waiting signal width T1 has passed, does the control proceed to step 410 which deactivates the sector mark waiting signal SMW (SMW="0") as shown in FIG. 6C.

Hereinafter, steps 405 through 410 are repeated, thus, the sector mark waiting signal SMW as shown in FIG. 6C is repeatedly set and reset.

In FIG. 5, note that the counter CNT0 is decremented by 1 at step 501, and the value of the counter CNT0 is guarded by 0 at steps 502 and 503. Similarly, the counter CNT1 is decremented by 1 at step 504, and the value of the counter CNT1 is guarded by 0 at steps 505 and 506. The routine of FIG. 5 is completed by step 507.

Figure 7:
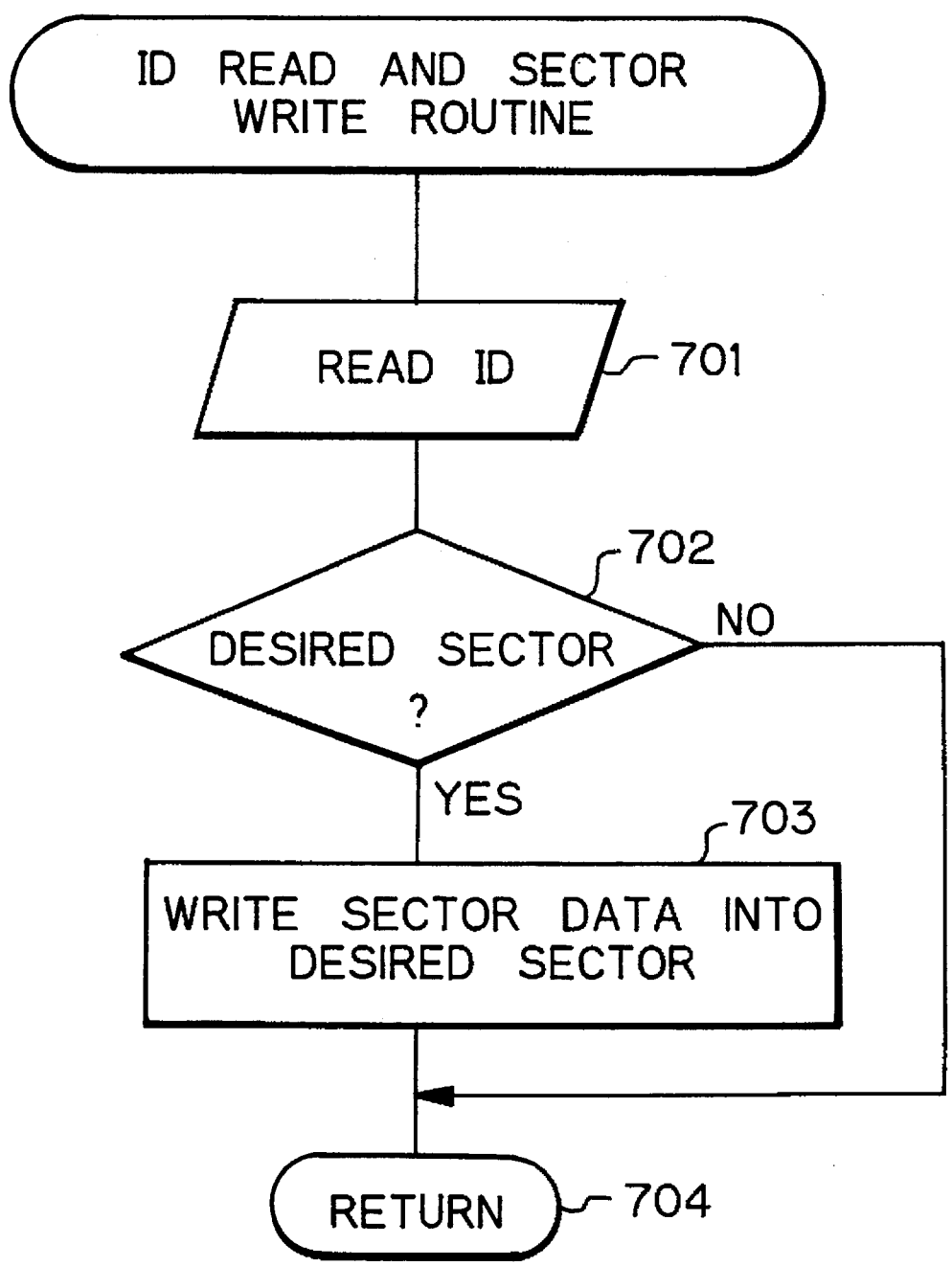

In an active state of the sector mark waiting signal SMW (SMW="1"), when a sector mark is detected to activate the Sector mark detecting signal SMD (i.e., SMD="1"), the output of the AND circuit 12 becomes active ("1"), i.e., the ID data read control signal IRD becomes active ("1"), thus moving the control from a sector mark waiting state to an ID data read and sector data write state which is shown in FIG. 7.

Referring to FIG. 7, at step 701, the sequencer 11 reads ID data including a head number, a cylinder number which is, in this case, formed by a zone number and a track number, and a sector number on the data DA from the magnetic disk interface 3, and at step 702, it is determined whether or not a desired/sector such as the fifth sector of the track 131 in the zone 121 is accessed. As a result, only when the desired sector is accessed, does the control proceed to step 703 which performs a write operation of sector data in the fifth sector of the track 131 in the zone 121 of the magnetic disk 110. Otherwise, the control proceeds to, step 704. This routine is completed by step 704.

In a sector data write state at step 703 of FIG. 7, however, even if the magnetic head is moved from the location E of the fifth sector of the track 131 to the location F of the sixth sector of the track 132, the writing operation of sector data in the sixth sector of the track 132 continues. As a result, when the magnetic head 2 reaches the location D of the sixth sector of the track 132, a sector mark is detected to activate the sector mark detecting signal SMD. Even in this case, since the sector mark waiting signal SMW is inactive, the output of the AND circuit 12, i.e., the ID data read control signal IRD remains inactive (IRD="0"). Thus, the operation of writing sector data upon the sixth sector of the track 132 is continued and as a result, the magnetic head reaches the location G of the track 132, to thereby complete the write operation of sector data.

Thus, according to the magnetic disk controller 1 of FIG. 3 the data from the location F to the location G of the track 132 are erased by an erroneous write operation.

Figure 8:
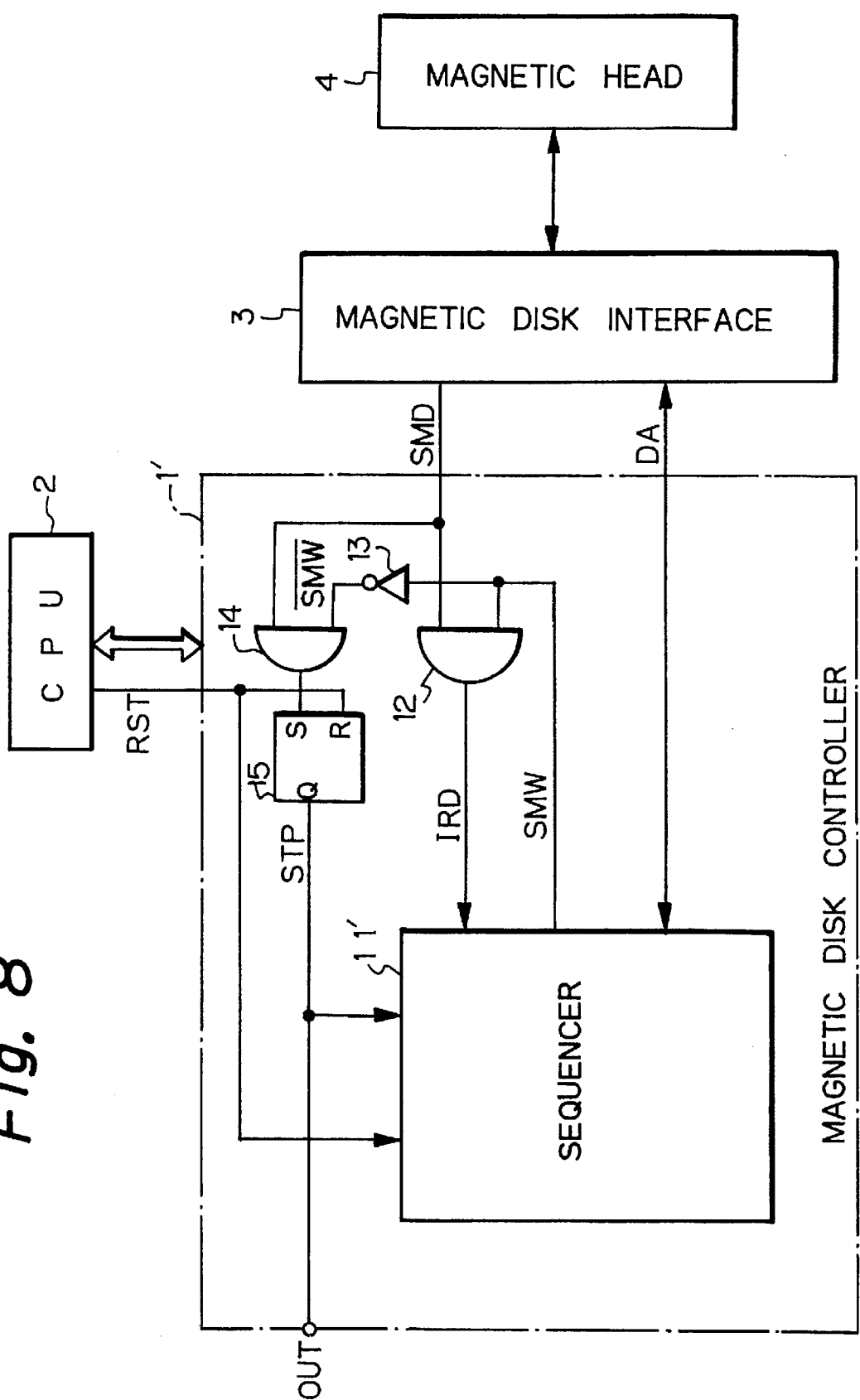
FIG. 8 is a block diagram illustrating a first embodiment of the magnetic disk controller according to the present invention.

In FIG. 8, which illustrates a first embodiment of the present invention a magnetic disk controller 1' further includes an inverter 13, an AND circuit 14, and a RS flip-flop 15, in addition to the elements of the magnetic disk controller 1 of FIG. 3. Also, the CPU 2 generates a reset signal RST and transmits it to the sequencer 11 and the reset input of RS flip-flop 15. Thus, the RS flip-flop 15 is reset as occasion demands.

In the magnetic disk controller 1' of FIG. 8, an inverted signal $\overline{SMW}$ of the sector mark waiting signal SMW and the sector mark detecting signal SMD are supplied to the AND circuit 14. Also, the output of the AND circuit 14 is supplied to the set input of the RS flip-flop 15. The output Q of the RS flip-flop 15 generates a write operation stop signal STP and transmits it to a sequencer 11'. As a result, when the write operation stop signal STP is active (STP="1"), the sequencer 11" stops its write operation.

That is, each time the reset signal RST is made active ("1"), the RS flip-flop 15 is reset to deactivate the write operation stop signal STP. In this state, the sequencer 11' can generate write data. Also, in a sector mark waiting state (SMW="1"), even when a sector,mark is detected to activate the sector mark detecting signal SMD, the output of the AND circuit 14 remains low ("0"), so that the RS flip-flop 15 is not set. Conversely, in a non-sector mark waiting state (SMW="6"), when a sector mark is detected to activate the sector mark detecting signal SMD, the output of the AND circuit 14 is changed from low ("0") to high ("1"), thus setting the RS flip-flop 15. As a result, the sequencer 11' stops its write operation.

When no deviation of the location of the magnetic head 4 occurs, the magnetic disk controller 1' of FIG. 8 operates in the same way as the magnetic disk controller 1 of FIG. 3. On the other hand, when a deviation of the location of the magnetic head 4 occurs, the magnetic disk controller 1' is operated so as to reduce the amount of data erased by an erroneous write operation.

For example, in a sector data write state at step 703 of FIG. 7, even if the magnetic head 4 is moved from the location E of the fifth sector of the track 131 to the location F of the sixth sector of the track 132, the operation of writing sector data in the sixth sector of the track 132 continues. As a result, when the magnetic head 4 reaches the location D of the sixth sector of the track 132, a sector mark is detected to activate the sector mark detecting signal SMD. In this case, since the inverted signal SMW of the sector mark waiting signal SMW is active, the output of the AND circuit 14 becomes active ("1"), to thereby set the RS flip-flop 15. As a result, the write operation stop signal STP is made active ("1"), and therefore, the sequencer 11' stops the write operation of sector data.

Thus, according to the magnetic disk controller 1' of FIG. 8, since the write operation is stopped just after an erroneous write operation is performed upon the location F to the location D of the sixth sector of the track 132, the data from the location D to the location G of the sixth sector of the track 132 is not erased. In other words, the seventh sector of the track 132 is not destroyed, and the erasure of data by an erroneous write operation due to the deviation of the location of the magnetic head 2 occurs in at most one sector.

Also, in FIG. 8, since the output of the RS flip-flop 15 is supplied to an output terminal OUT, it can be recognized from the potential at the terminal OUT whether or not a deviation of the location of the magnetic head has occurred.

Figure 9:
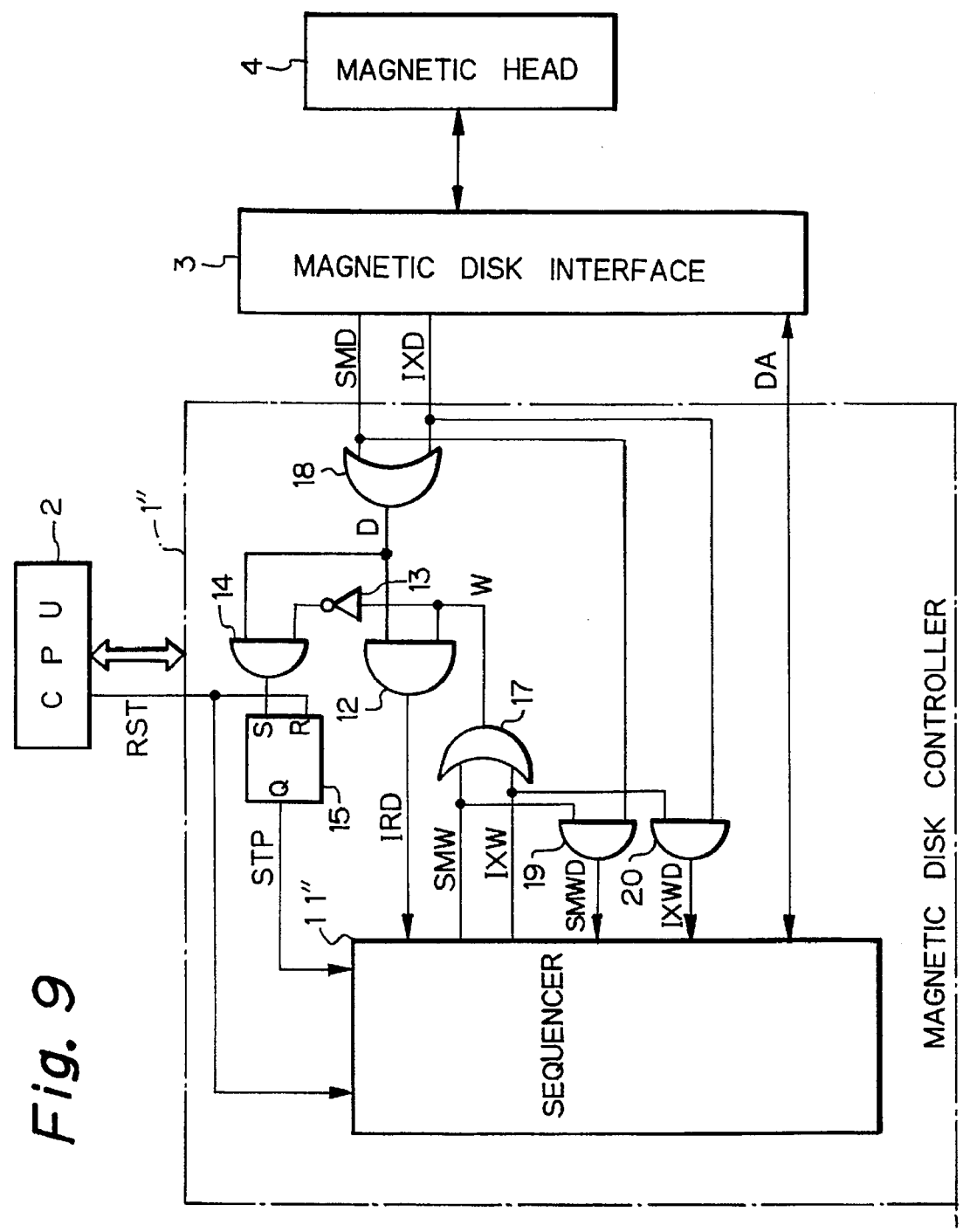
FIG. 9 is a block circuit diagram illustrating a second embodiment of the magnetic disk controller according to the present invention.

In FIG. 9, which illustrates a second embodiment of the present invention, a magnetic disk controller 1" includes OR circuits 17 and 18 and AND circuits 19 and 20 in addition to the elements of the magnetic disk controller 1' of FIG. 8. In FIG. 9, the OR circuit 17 receives the sector mark waiting signal SMW and an index waiting signal IXW from a sequencer 11" to generate a waiting signal W. The waiting signal W serves as the sector mark waiting signal SMW of FIG. 8. Also, the OR circuit 18 receives the sector mark detecting signal SMD and an index detecting signal IXD from the disk interface unit 3, to generate a detecting signal D. The detecting signal D serves as the sector mark detecting signal SMD of FIG. 8. Note that the index detecting signal IXD is generated at one revolution of the magnetic disk by using an optical sensor or a magnetic sensor (not shown). The AND circuit 19 passes the sector mark detecting signal SMD when the sector mark waiting signal SMW is active ("1"). In this case, the passed sector mark detecting signal SMD is denoted by SMWD. Also, the AND circuit 20 passes the index detecting signal IXD when the index waiting signal IX is active ("1"). In this case, the passed index detecting signal IXD is denoted by IXWD.

Figure 10:
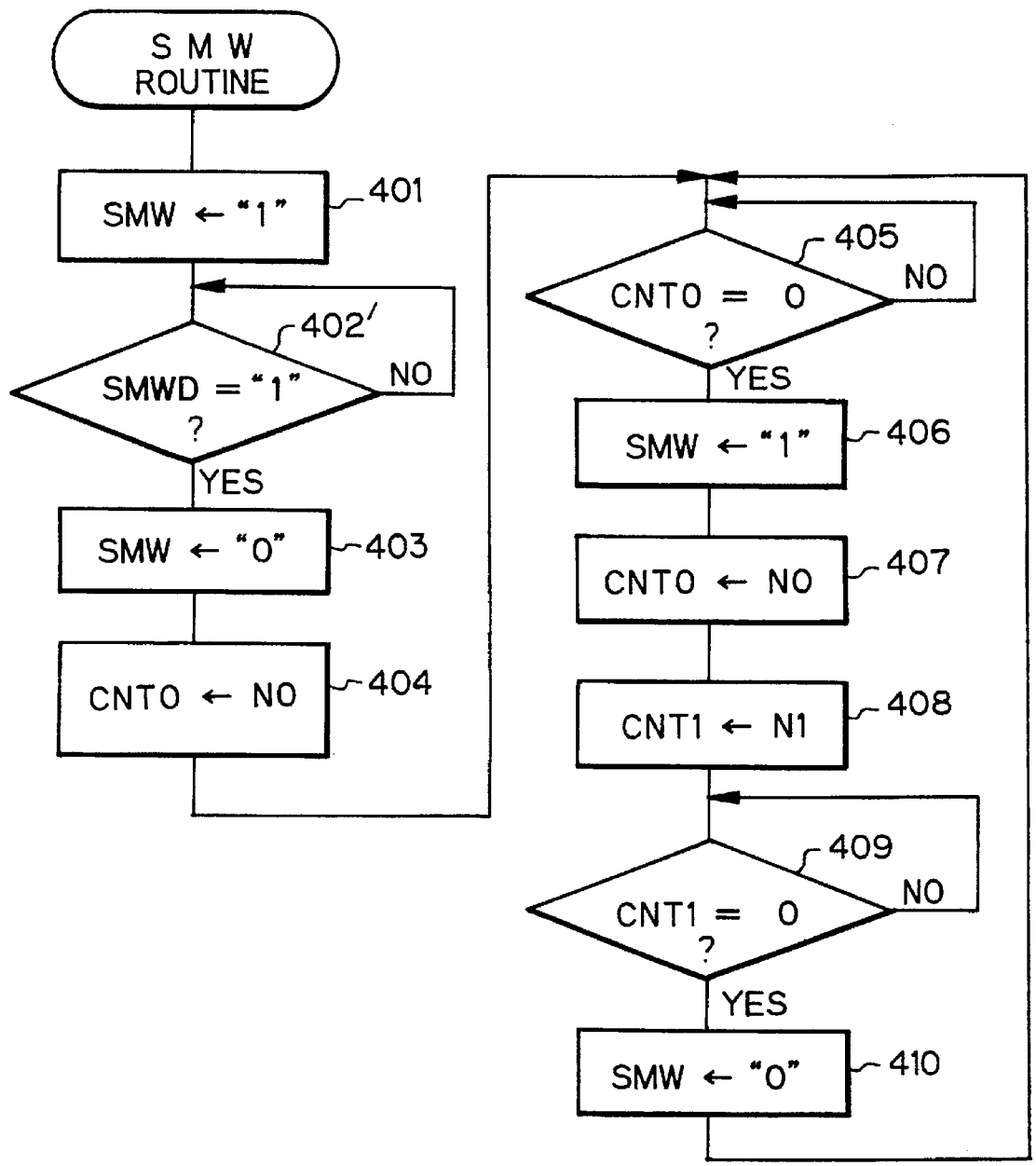
FIGS. 10, 11 and 12 are flowcharts showing the operation of the sequencer of FIG. 9.

The sector mark waiting signal SMW of FIG. 9 is generated by a sequencer 11" using the logic shown in FIG. 10 which is similar to that of FIG. 4. That is, in FIG. 10, step 402' is provided instead of step 402 of FIG. 4. That is, in FIG. 8, the ID data read control signal IRD is derived from the sector mark detecting signal SMD and the index detecting signal IXD, and it is impossible by the ID data read control signal IRD to discriminate the sector detecting signal SMD from the index detecting signal IXD. Therefore, in this case, an initialization for the first sector mark detecting signal SMD is carried out by using the signal SMWD through the AND circuit 19.

Figure 11:
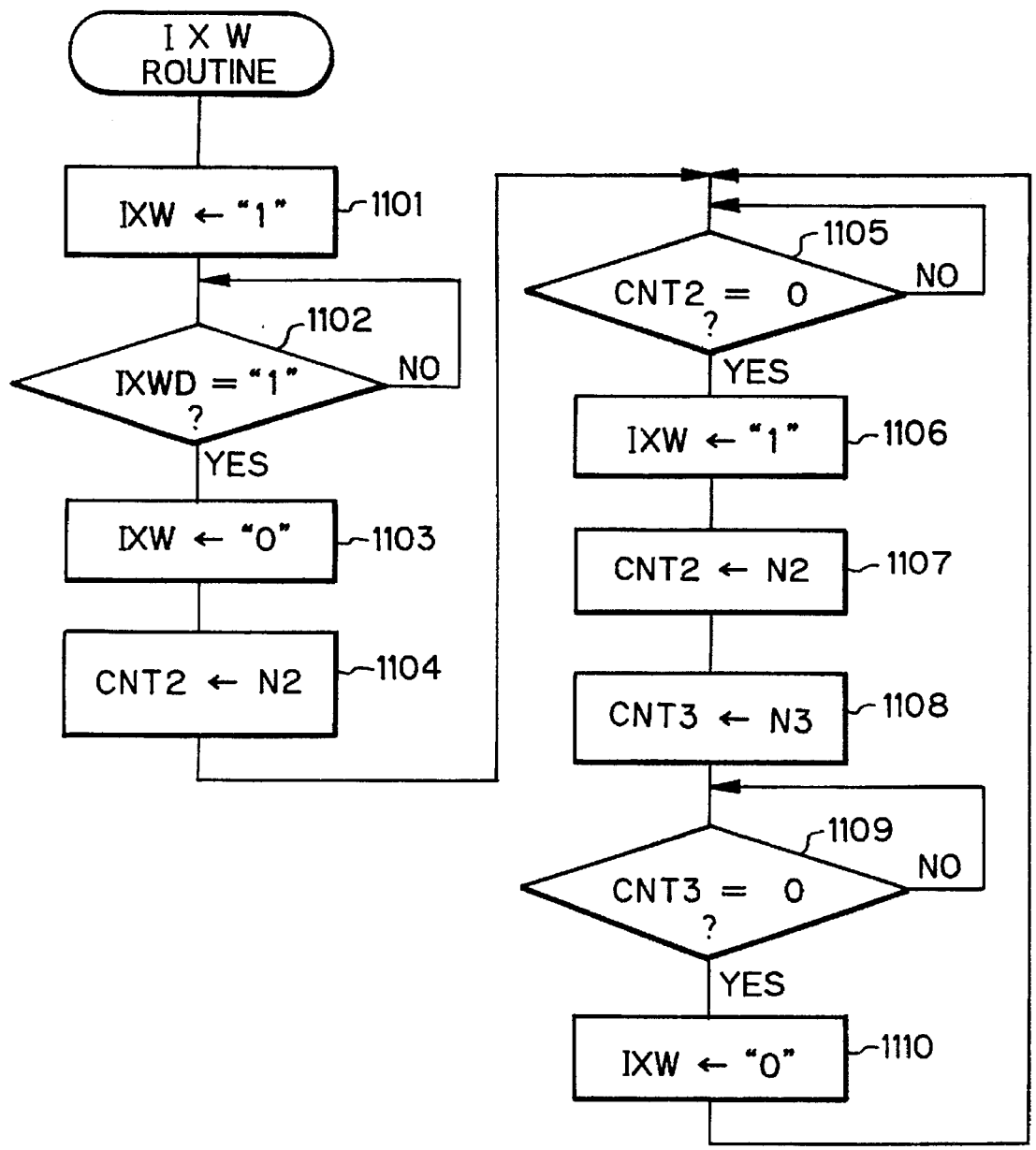
Figure 12:
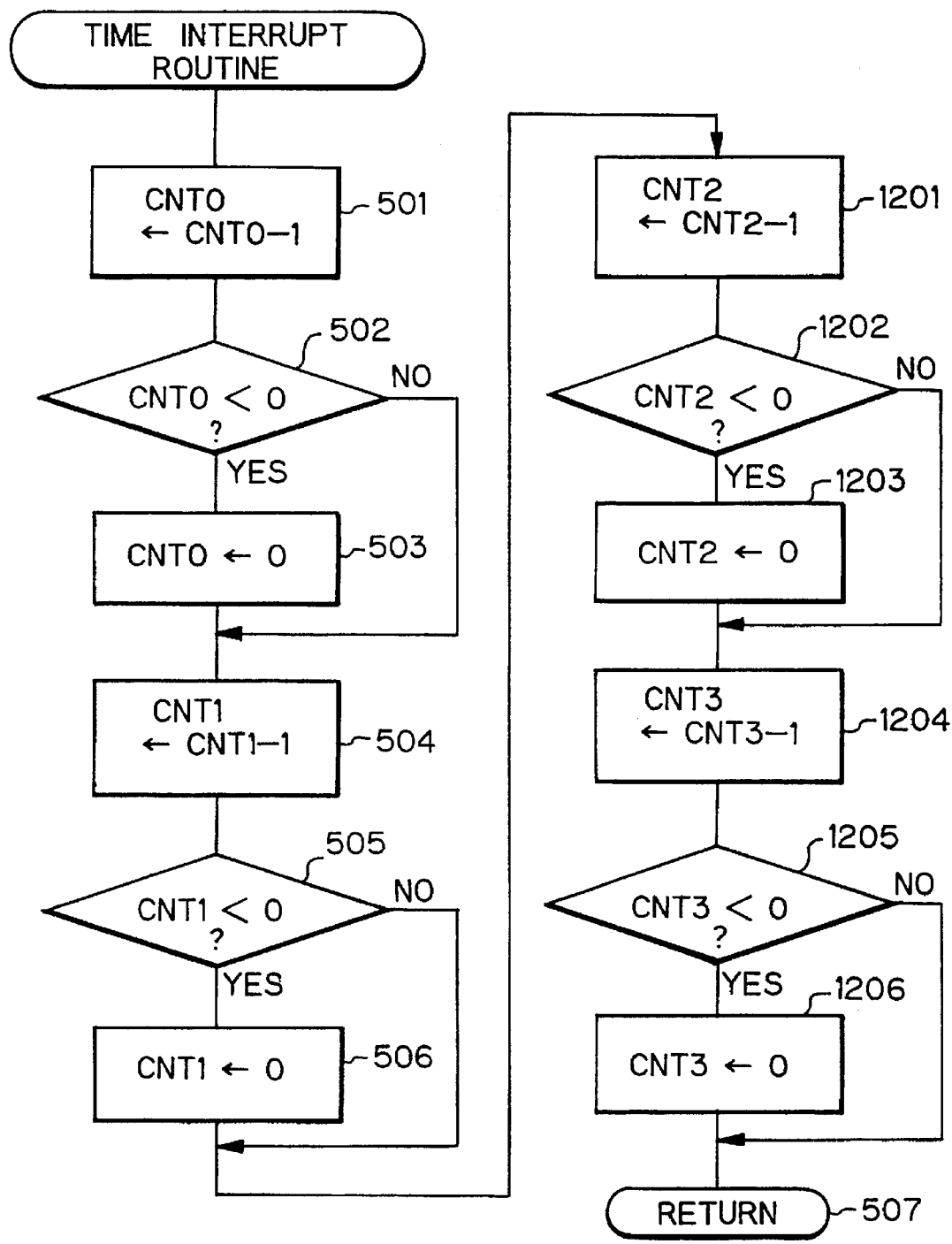
Figure 13A:
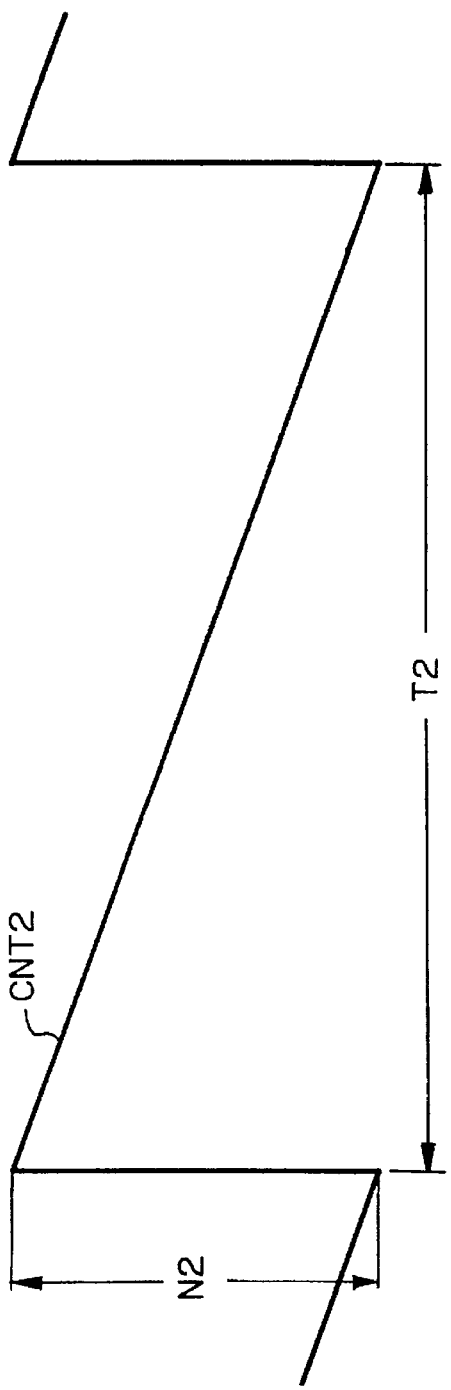
FIGS. 13A, 13B and. 13C are timing diagrams showing the operation of the sequencer of FIG. 9.

The index waiting signal IXW is generated by the sequencer 11" using the logic shown in FIG. 11, which is similar to FIG. 10. That is, an IXW routine of FIG. 11 is initiated by turning ON the magnetic disk controller 1". Steps 1101 through 1104 carry out an initialization. That is, at step 1101, the index waiting signal IXW is made active ("1"), and at step 1102, the sequencer 11 waits for a first sector mark detecting signal IXD which is, in this case, a first signal IXWD due to the activation of the index waiting signal IXW. Once the first IXWD is made active, the control proceeds to step 1103 which makes the index waiting signal IXW inactive. Then, at step 1104, an index interval value N2 is set in a counter CNT2. Thus, the counter CNT2 is initialized to be counted down by a time interrupt routine as illustrated in FIG. 12 which is carried out at predetermined time intervals. Note that the index interval value N2 corresponds to an index interval T2 as shown in FIG. 13A. Thus, an initialization for the first index detecting signal IXD (or IXWD) is completed.

At step 1105, it is determined whether or not the value of the counter CNT2 reaches zero, i.e., whether or not an index interval T2 has passed. Only when the index interval T2 has passed, does the control proceed to step 1106 which activate the index waiting signal IXW (IXW="1") as shown in FIG. 13C.

Figure 13B:
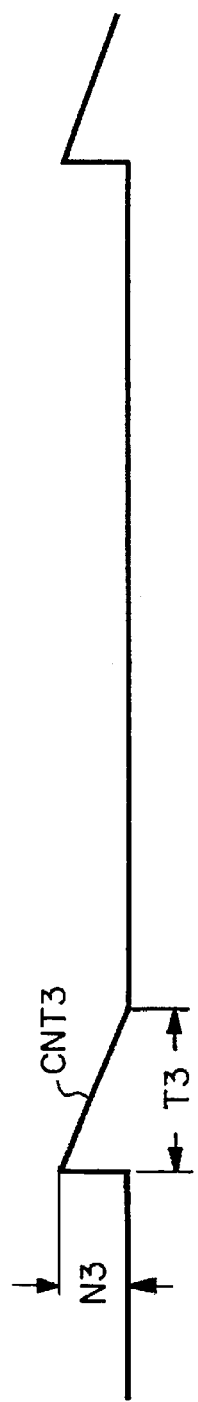

At step 1107, an index interval value N2 is set in the counter CNT2. Also, at step 1108, an index waiting signal width value N3 is set in a counter CNT3. Thus, both the counters CNT2 and CNT3 are initialized to be counted down by the routine as illustrated in FIG. 12. Note that the index waiting signal width value N3 corresponds to an index waiting signal width T3 as shown in FIG. 13B.

At step 1108, it is determined whether or not the value of the counter CNT3 reaches zero, i.e., whether or not an index waiting signal width T3 has passed. Only when the index waiting signal width T3 has passed, does the control proceed to step 1110 which deactivates the index waiting signal IXW (IXW="0") as shown in FIG. 13C.

Figure 13C:

Hereinafter, steps 1105 through 1110 are repeated, and thus, the index waiting signal IXW as shown in FIG. 13C is repeatedly set and reset.

In FIG. 12, steps 1201 through 1206 are added to the routine of FIG. 5. That is, the counter CNT2 is decremented by 1 at step 1201, and the value of the counter CNT2 is guarded by 0 at steps 1202 and 1203. Similarly, the counter CNT3 is decremented by 1 at step 1204, and the value of the counter CNT3 is guarded by 0 at steps 1205 and 1206. The routine of FIG. 12 is completed by step 507.

In FIG. 9, note that the sequencer 11" is so well as the logic shown in FIG. 11, in parallel.

As explained hereinbefore, according to the present invention, when a deviation of the location of the magnetic head occurs due to the vibration of the magnetic disk unit or the like, the amount of erased or destroyed data can be reduced.

Although the invention has been described in detail above in connection with various preferred embodiments thereof, it will be appreciated by those skilled in the art that these embodiments have been provided solely for purposes of illustration, and are in no way to be considered as limiting the invention. Instead, various modifications and substitutions of equivalent techniques will be readily apparent to those skilled in the art upon reading this specification, and such modifications and substitutions are to be considered as falling within the true scope and spirit of the following claims.

I claim:

1. A magnetic disk controller for writing data into a selected one of a plurality of sectors provided in a magnetic disk, said controller comprising a terminal supplied with a sector mark detecting signal indicative of a border between adjacent ones of said sectors, said sector mark detecting signal being thereby produced each time an accessible one of said sectors is changed based on rotation of said magnetic disk, first means for generating a sector mark waiting signal which takes first and second levels alternately in a predetermined cycle, a first gate circuit supplied with said sector mark detecting signal and said sector mark waiting signal, said first gate circuit producing a first control signal upon receiving said sector mark detecting signal during said first level of said sector mark waiting signal, a second gate circuit supplied with said sector mark detecting signal and said sector mark waiting signal, said second gate circuit producing a second control signal upon receiving said sector mark detecting signal during said second level of said sector mark waiting signal, and second means for initiating a data write operation on a new sector in response to said first control signal and for stopping said data write operation in response to said second control signal.

2. A magnetic disk controller as claimed in claim 1, further comprising a reset terminal supplied with a reset signal, said second gate circuit includes a logic gate circuit and a flip-flop circuit, said logic gate circuit supplied with said sector mark detecting signal and said sector mark waiting signal, and producing a set signal upon receiving said sector mark detecting signal during said second level of said sector mark waiting signal, said flip-flop circuit supplied with said set signal and said reset signal, coupled to said sequencer and to said reset terminal, and producing said second control signal upon receiving said set signal and not producing said second control signal upon receiving said reset signal.

3. A combination comprising a magnetic disk having a plurality of sectors, an interface unit coupled to said magnetic disk for producing a first signal each time a border between adjacent ones of said sectors appears by rotation of said magnetic disk, a disk controller coupled to said interface unit to receive said first signal, said disk controller, in response to said first signal, identifying a certain sector in which data is to be written and performing a data write operation for writing data into said certain sector while generating a second signal that masks said first signal, a gate circuit producing a third signal when said interface unit produces said first signal during generation of said second signal, and means for supplying said third signal to said disk controller to cause disk controller to stop performing said data write operation.

4. A method of writing data into a selected one of a plurality of sectors provided into a magnetic disk, comprising the steps of:

generating a sector mark detecting signal each time an accessible one of said sectors is changed based on rotation of said magnetic disk;

generating a sector mark waiting signal which takes first and second levels alternately in a predetermined cycle;

producing a first control signal when said sector mark detecting signal is generated during said first level of said sector mark waiting signal;

producing a second control signal when said sector mark detecting signal is generated during said second level of said sector mark waiting signal;

responding to said first control signal to detect whether a newly-accessible one of said sectors is identical with said selected one of said sectors;

performing a data write operation for writing data into said newly-accessible one of said sectors when said newly-accessible one of said sectors is detected to be identical with said selected one of said sectors; and stopping, when said second control signal is generated during performance of said data write operation, said data write operation.

* * * * *